Nov. 26, 1957 E. B. CLARK 2,814,509
ARMORED CABLE CLAMP FOR A BEVELED CORNER BOX
Filed Sept. 29, 1954
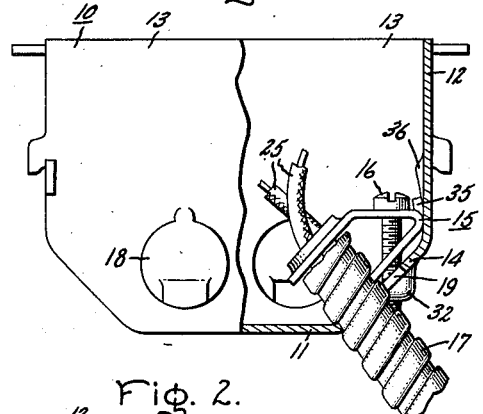
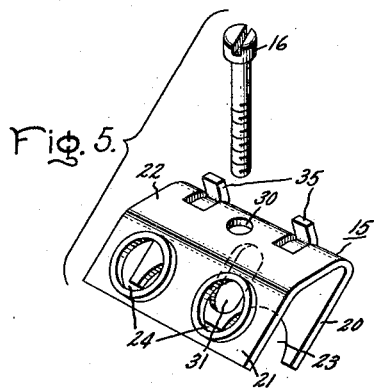
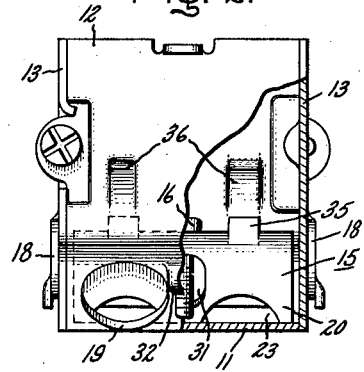
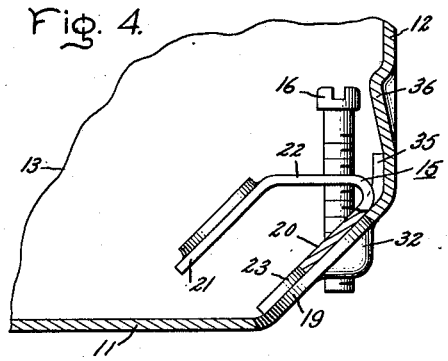
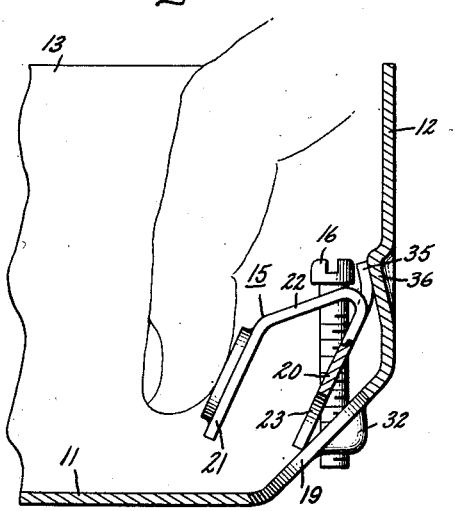
Inventor:
Edward B. Clark,
by Allard A. Braddock
His Attorney.

United States Patent Office 2,814,509
Patented Nov. 26, 1957

2,814,509

ARMORED CABLE CLAMP FOR A BEVELED CORNER BOX

Edward B. Clark, Milford, Conn., assignor to General Electric Company, a corporation of New York Application September 29, 1954, Serial No. 459,064

2 Claims. (Cl. 285—128)

The present invention relates to sheet metal boxes which are adapted to be mounted in the walls of buildings as part of the wiring system for the building. This type of box is generally referred to as a switch box and hereinafter it will be so described. However, other generally accepted designations are outlet boxes or device boxes. This invention is particularly concerned with a beveled corner switch box and a cable clamp for rigidly securing the ends of armored cable that enter through the beveled corners of the box. It is believed that this is one of the few, if not the first, armored cable clamps that has ever been successfully devised for a beveled corner box.

In connection with armored cable, it is a requirement of the Underwriters' Laboratories, Inc., that the cable clamp should anchor the cable firmly in place to withstand a minimum pulling force applied to the cable and that it should limit the amount of the armored sheath of the cable which extends into the box through the conventional pry-out openings. This invention is particularly advantageous in "old work" when the electrician is required to extend the wiring circuits after the building is completed. It is always easier and less time consuming to install an adequate wiring system during the construction of the building than it is to attempt to extend the circuit after the walls are covered and the building is sealed for insulating purposes.

On a construction where it is necessary to add an additional convenience outlet, a hole patterned as nearly as possible from the shape of the box must be made in the wall to gain access to the air space within the wall. Then, a length of cable must be brought into the wall leading from an existing box to the location for the additional outlet. If the box were a conventional square cornered box and the cable entered the box through a side wall which is arranged uppermost when the box is inserted in the wall, it is quite difficult to clamp the end of the armored cable in the box and then try to force the box and the cable back through the opening in the wall when the opening is nearly the shape of the box. Only if the hole is oversized will it be at all possible to successfully force the stiff armored cable back into the wall and at the same time angle the box so that it will slip through the wall opening. It will be appreciated by those skilled in this art that it is practically impossible to perform such an operation when two or more lengths of cable are clamped in the box from opposite directions. Then, it is necessary to strip a long length of armored sheath from the cable so that there is sufficient length of insulated conductors to grip as the box is forced into the wall opening. Once the box is in place, the cables are pulled into the box as far as possible and then the clamps are tightened over the cable ends. Then it is necessary to shorten the strips of the conductors within the box so that there will be space to fasten the outlet in the box.

Another important advantage that is realized by the use of this invention is the ease with which the armored cable may be clamped in the box. Lancings are provided along the upper edge of the clamp to act against tapered embossments on an adjacent side wall of the box so that it is possible to wedge the clamp into a fixed position between the beveled wall of the box and the side wall containing the embossments. When this is done, it is possible to insert one or both of the lengths of armored cable through the beveled wall of the box and hold them in place with one hand while the other hand is able to manipulate a screw driver for turning the fastening screw down onto the clamp to secure the cable in the box. Without this wedging action, it would be awkward to clamp the cable in the box for when the cable is inserted through the pry-out openings, the clamp would tend to engage with the convolutions in the armor and be carried along with the cable as it is pushed into the box. Thus, the clamp would be out of proper alignment and it would be necessary to force the clamp back so that its clamping plate acts close to the beveled wall of the box to force the convolutions of the cable against the edge of the pry-out opening to provide the necessary grip to react against any force applied to the cable tending to loosen it in the box.

The principal object of this invention is to provide a beveled corner switch box with an armored cable clamp for securing cable that enters through the beveled walls of the box.

A further object of this invention is to provide an armored cable clamp for a beveled corner box with a pair of lancings which serve as spring members arranged as upward extensions of the clamping plate.

A further object of this invention is to provide a beveled corner box with side walls having tapered embossments for cooperation with the lancings of an armored cable clamp so that the clamp may be wedged in the corner of the box to facilitate the insertion and subsequent clamping of the cable in the box.

A still further object of this invention is to provide an armored cable clamp for a beveled corner box so that the clamp will be wedged in the corner of the box and out of the way of the cable as it is inserted in the box.

My invention will be better understood from the following description taken in connection with the accompanying drawing, and its scope will be pointed out in the appended claims.

In the drawing:

Fig. 1 is a partial sectional side elevational view of a beveled corner switch box containing an armored cable clamp embodying my invention.

Fig. 2 is a right-end elevational view of Fig. 1 showing the box partially cut away and minus the armored cable.

Fig. 3 is an enlarged view showing the manner in which the armored cable clamp is wedged in the corner of the box to facilitate the insertion of the cable therein.

Fig. 4 is a view similar to Fig. 3 showing the armored cable clamp in its extreme downward position.

Fig. 5 is a perspective view showing in detail the armored cable clamp embodying my invention as well as the fastening screw that is used therewith.

Referring in detail to the drawing, Fig. 1 illustrates a side view of a sectional switch box 10 having a bottom wall 11 and side walls 12 and 13. Since this is a beveled corner box, the beveled walls 14 are arranged to join the bottom wall 11 with the side walls 12. The box 10 is supplied with a pair of identical armored cable clamps 15 which are each located in the beveled corners of the box although only one such clamp is illustrated in the drawing. The fastening screw 16 is provided to hold the clamp in the box and to force the clamp to grip the armored cable 17 which enters through the beveled wall 14 of the box. Pairs of pry-outs 18 are formed in the side walls 13 as well as in the beveled walls 14. A pry-out, as the name implies, is a portion of the wall of the box which has been partially stamped out during the manufacture of the box to form a nearly circular hole. The stamped-out portion is then forced back into the wall of the box so that it may be easily removed by an electrician to form a cable entrance aperture. Pry-outs are formed in the walls of an electric box to permit ready access to the interior of the box and yet to prevent unnecessary openings being made in the box which might allow electric arcs to spread from the box and cause a fire hazard, as well as to prevent the entrance of foreign objects. The pry-out openings 19 formed in the beveled walls 14 extend upwardly from the bottom wall 11 of the box.

The clamp 15, which is best shown in Fig. 5, is made from a single piece of folded sheet metal material and it comprises a clamping plate 20, an armor stop plate 21, and an intermediate connecting plate 22. The lower edge of the clamping plate 20 is provided with a pair of semi-circular openings 23 which are spaced to be in alignment with the pry-out openings 19 formed in the beveled wall 14 of the box. It is the top edge of these openings 23 which engages in the convolutions of the armored cable to form a tight grip on the cable. An additional function of the clamping plate 20 is to close up the pry-out opening 19 through which the cable 17 extends so that the box has no objectionable openings that would render it unsafe for concealment in a wall. The clamping plate 20 and the stop plate 21 are arranged generally parallel to each other and at an oblique angle with respect to the connecting plate 22, forming an inclined U-shaped member as is best shown in Fig. 3. The stop plate 21 is also provided with a pair of bushed conductor openings 24 which are spaced to be in alignment with the semi-circular openings 23 and the pry-out openings 19 of the box. The purpose of the stop plate 21 is to limit the amount of armor sheath that extends into the box. The openings 24 are of such a size that they will allow the insulated conductors 25 of the cable 17 to extend therethrough, but even the smallest size of armored cable is too large in diameter to fit through these openings. In actual practice, a fiber bushing (not shown), which is split longitudinally and has an outer shoulder, is placed at the end of the cable between the steel armor and the insulated conductors 25 and is held in place by the stop plate 21. This bushing provides protection against the sharp edges of the armor which might puncture the insulation and cause a ground or a short circuit.

An over-sized opening 30 is made through the connecting plate 22 and an elongated opening 31 is formed in the clamping plate 20 to underlie the opening 30 so that the fastening screw 16 may extend through the clamp and be threaded into the tapped protrusion 32 formed in the beveled wall 14 of the box. The tapped hole (not shown) in the protrusion 32 is formed so that the screw 16 will extend perpendicular with respect to the bottom wall of the box. The over-sized opening 30 and the elongated opening 31 are so shaped that the clamp may angle with respect to the fastening screw 16 from the extreme position of Fig. 3 to the opposite extreme position of Fig. 4.

A pair of lancings or fingers 35 are struck out of the connecting plate 2 and arranged as upward extensions of the clamping plate 20 and formed in the opposite direction therefrom. Also, a pair of cooperating tapered abutments or embossments 36 are formed on both of the side walls 12 of the box with the tapered surface extending from the plane of the wall inwardly and upwardly toward the front opening of the box.

The switch box 10 is furnished to the trade with the pair of armored cable clamps 15 loosely mounted in the beveled corners of the box. In order to secure the cable 17 in the box, the pry-outs 18 in the beveled wall 14 are removed to provide the openings 19. The screw 16 is then backed out so that the clamp may be forced upwardly, as shown in Fig. 3, until the clamp 15 is wedged in the corner with the lancings 35 in spring engagement with the tapered embossments 36 while the lower edge of the clamping plate 20 tends to dig into the inner surface of the beveled wall 14. With only a slight pressure, it is possible to wedge the clamp in the position shown in Fig. 3 so that the clamp will not move while the armored cable is being inserted into the box. For instance, if it were necessary to clamp two lengths of cable in the beveled wall 14 of Fig. 3, the clamp 15 would first be wedged into the corner so that it would remain in place without the electrician holding it. The cables would first be inserted into the box with the end of the armor acting against the underside of the stop plate 21. The cable could be held there by the electrician's left hand while his right hand, holding a screw driver, would be used to thread the screw 16 into the box thereby forcing the clamp down and into engagement with a convolution of the armored sheath. While so doing, the cable should be moved slightly relative to the box so that the convolutions would engage in both the edge of the pry-out opening 19 and the semi-circular openings 23 of the clamping plate 20. Once the screw 16 is tightly fastened down, the cable 17 is, for all practical purposes, rigidly secured in the box. Since the box 10 is a beveled corner box, it would be an easy matter to force the cable back through an opening in a finished wall and into the air space within the wall. It would also be possible to mount the box 10 in an opening no larger than the box formed by the side walls 12 and 13.

Consequently, having described my invention of an improved beveled corner box having armored cable clamps, it will be readily apparent to those skilled in this art that I have provided a clamp which is simple in design and reliable in operation as well as of great benefit to the electrician installing additional circuits in a finished building.

Modifications of this invention will occur to those skilled in this art, and it is to be understood, therefore, that this invention is not limited to the particular embodiment disclosed, but that it is intended to cover all modifications which are within the true spirit and scope of this invention.

What I claim as new and desire to secure by Letters Patent of the United States is:

1. In combination, a beveled corner switch box and an armored cable clamp for clamping cable entering through the bevels of the box, the said clamp comprising a clamping plate, a stop plate, and an intermediate connecting plate, the said clamping plate and stop plate being substantially arranged parallel to each other and at an oblique angle with respect to the connecting plate, a pair of conductor openings in said stop plate to receive the insulated conductors of the cable to be clamped, an oversized screw hole in the connecting plate and an elongated screw opening in the clamping plate for receiving a fastening screw therethrough so that the clamp may angle with respect to the screw means, a pair of lancings struck out of the connecting plate and formed as upward extensions of the clamping plate, and a pair of complementary inner abutments on the adjacent side wall of the box, said abutments being inclined inwardly from the bottom wall of the box so that the clamp may be wedged in place with the lancings spring-pressed against the abutments and the lower edge of the clamping plate in engagement with the adjacent beveled wall of the box to assist in the proper clamping of the armored cable as it is being installed in the box.

2. The combination of a beveled corner switch box and an armored cable clamp as recited in claim 3 wherein the said abutments are embossments on the said adjacent side wall of the box.

References Cited in the file of this patent

UNITED STATES PATENTS

| | | |
|---|---|---|
| 1,687,750 | Boyton | Oct. 16, 1928 |
| 1,778,624 | Carlson | Oct. 14, 1930 |
| 2,480,522 | Tornblom | Aug. 30, 1949 |
| 2,688,417 | Bowers | Sept. 7, 1954 |